(12) United States Patent
Lee (10) Patent No.: US 10,715,711 B2
(45) Date of Patent: Jul. 14, 2020

(54) ADAPTIVE THREE-DIMENSIONAL IMAGING SYSTEM AND METHODS AND USES THEREOF

(71) Applicant: Marvel Research Ltd., Wanchai (HK)

(72) Inventor: Ying Chiu Herbert Lee, Wanchai (HK)

(73) Assignee: Marvel Research Ltd., Wanchai (HK)

( * ) Notice: Subject to any disclaimer, the term of this patent is extended or adjusted under 35 U.S.C. 154(b) by 20 days.

(21) Appl. No.: 16/164,390

(22) Filed: Oct. 18, 2018

(65) Prior Publication Data

US 2019/0141226 A1 May 9, 2019

(30) Foreign Application Priority Data

Nov. 6, 2017 (CN) .......................... 2017 1 1080588

(51) Int. Cl.
*H04N 5/225* (2006.01)
*G02B 3/00* (2006.01)
*G02B 27/08* (2006.01)
*G02B 17/00* (2006.01)
*H04N 13/232* (2018.01)

(52) U.S. Cl.
CPC ....... *H04N 5/22541* (2018.08); *G02B 3/0037* (2013.01); *G02B 17/006* (2013.01); *G02B 27/08* (2013.01); *H04N 13/232* (2018.05); *G06T 2207/10052* (2013.01)

(58) Field of Classification Search
CPC ............. H04N 5/2254; H04N 5/22541; H04N 13/232; H04N 13/243; H04N 13/282; G02B 27/08; G02B 27/126; G02B 17/006; G02B 6/3522; G02B 5/265; G02B 3/0006–0075
See application file for complete search history.

(56) References Cited

U.S. PATENT DOCUMENTS

| 2010/0141802 A1 | 6/2010 | Knight et al. |
| 2013/0113981 A1 | 5/2013 | Knight et al. |
| 2016/0057407 A1 | 2/2016 | Klehm et al. |
| 2019/0137731 A1* | 5/2019 | Berestov .............. G02B 3/0043 |

OTHER PUBLICATIONS

Aug. 6, 2018 European Search Report issued by the European Patent Office for European Application No. 18178697.1.
Aug. 22, 2018 Communication pursuant to Article 94(3) EPC issued by the European Patent Office for European Application No. 18178697.1.

* cited by examiner

*Primary Examiner* — Paul M Berardesca
(74) *Attorney, Agent, or Firm* — Duane Morris LLP (57) ABSTRACT

An adaptive 3D imaging system comprising an imaging part and a lens part detachably connected thereto; the imaging part comprising a sensor and a reflector configured to transmit a plurality of captured light field images to the sensor; wherein the lens part comprising a first camera lens positioned at a first end of the lens part, a second camera lens positioned at a second end of the lens part, an entrance pupil plane and matching device positioned between the first camera lens and the second camera lens and being adaptive to different focal lengths of the second camera lens, an internal reflection unit positioned between the first camera lens and the entrance pupil plane and matching device and configured to decompose the captured light field images and refract them into a plurality of multiple secondary images with different angular offsets. Methods and uses involving the 3D imaging system are included.

8 Claims, 6 Drawing Sheets

ADAPTIVE THREE-DIMENSIONAL IMAGING SYSTEM AND METHODS AND USES THEREOF

CROSS-REFERENCE TO RELATED APPLICATIONS

This application claims priority and the benefit of Chinese Patent Application No. 201711080588.6, filed Nov. 6, 2017, which is incorporated by reference herein in its entirety. All references and products cited within this application and the contents thereof are incorporated by reference herein in their entirety.

TECHNICAL FIELD

This disclosure pertains to the field of monocular three-dimensional (3D) imaging, and more particularly to an adaptive 3D imaging system based on light field technology.

BACKGROUND

A variety of cameras are available to capture 3D images. The most typical method involves using two identical cameras that are linearly arranged and spaced apart from each other at a certain distance to simulate how human eyes work. However, 3D cameras are expensive, and distance perception is largely affected by the photographing distance. Another method involves adding two reflector boxes in front of the camera, wherein the reflector boxes act as a left eye and a right eye, respectively. The images projected from the reflector boxes to the camera sensor are 3D images. This arrangement is inexpensive to build, but the 3D depth is restricted, and the resolution is low. To solve these problems, some companies have developed laser-assisted cameras and plenoptic cameras to capture 3D images. The laser-assisted camera includes a high-resolution camera, a laser light emitting device and a sensor. This arrangement can capture a highly accurate 3D depth because distance perception is calculated by the laser reflectivity. However, in addition to being expensive, the user interface and feel thereof for this device is poor. Light field cameras (also known as plenoptic cameras) are more advanced in design. Unlike the traditional cameras that only record the intensity of light, plenoptic cameras not only record the intensity and color of light in different positions but also record the direction of light in different positions. One kind of light field camera employs a microlens array placed in front of the traditional camera sensor to sense the intensity, color and direction information. Another kind of light field camera is a multi-camera array. Holography is also another kind of light field camera imaging technology using film. The first kind of light field camera described above is capable of directly capturing light field images, and the camera has a microlens array to reflect the light field respectively to sensor pixels in certain patterns. The 3D image and depth map can be extracted by computer image processing. However, the main disadvantage of this plenoptic camera is that it only captures the light field images in one direction/axis.

SUMMARY

As an overview, this application provides for a plenoptic camera, which costs less and solve the above-mentioned technical problems. The plenoptic camera comprises a reflective unit that is capable of capturing target images at multiple angles. At least 3D images and a depth map are generated after image processing.

An aspect of the disclosure provides for an adaptive 3D imaging system comprising an imaging part and a lens part detachably connected thereto, wherein the lens part has a first end and a second end; the imaging part comprising a sensor and a reflector configured to transmit a plurality of captured light field images to the sensor; wherein the lens part comprising a first camera lens positioned at the first end of the lens part and a second camera lens positioned at the second end of the lens part, an entrance pupil plane and matching device positioned between the first camera lens and the second camera lens and being adaptive to different focal lengths of the second camera lens, an internal reflection unit positioned between the first camera lens and the entrance pupil plane and matching device being and configured to decompose the captured light field images and refract them into a plurality of secondary images with different angular offsets. In an exemplary embodiment, the first end of the lens part is the back of the lens part and the second end of the lens part is the front of the lens part.

In an exemplary embodiment, the imaging part further comprises a compound eye lens configured to transmit the plurality of captured light field images to the sensor.

In an exemplary embodiment, the compound eye lens comprises an array of a plurality of microlenses, wherein each microlens comprises a radius, a thickness and an array spacing that are each related to the dimensions of the sensor.

In an exemplary embodiment, the apertures and focal lengths of the first camera lens and the second camera lens are adjustable. In another exemplary embodiment, the second camera lens is replaceable.

In an exemplary embodiment, the aperture of the second camera lens is greater than the dimensions of the internal reflection unit.

In an exemplary embodiment, the entrance pupil plane and matching device is a pupil lens, wherein the diameter of pupil lens is greater than the diameter of the internal reflection unit, and wherein the pupil lens is configure to allow the entrance light of the light field images to be refracted in the internal reflection unit.

In an exemplary embodiment, each secondary image has a different scene (which can be slightly different), and the dimensions of the internal reflection unit and the focal length of each secondary image are calculated based on the following equations (1) and (2):

$$\tan\left(\frac{FOV}{2}\right) \times Z/n \quad (1)$$

$$\frac{f_{lens}}{f_{sub}} = rFOV \quad (2)$$

wherein FOV is the field of view of the second camera lens;
n is the refractive index of the internal reflection unit;
r is the number of internal refractions;
Z is the dimension of the internal reflection unit;
$f_{lens}$ is the focal length of the second camera lens; and
$f_{sub}$ is the focal length for secondary image.

The imaging system disclosed in this application can capture 3D images from different angles. It is easy to manufacture and can be integrated with an existing plenoptic imaging system. The 3D imaging system can be detachable and hence provides a convenient way to convert an ordinary camera into a 3D camera that generates 3D images. Further, it provides cost-savings to the user and is easy to operate.

BRIEF DESCRIPTION OF THE DRAWINGS

The accompanying drawings, which are incorporated herein and form a part of the specification, illustrates aspects of the disclosure and, together with the description, further serve to explain the principles of the aspects and to enable a person skilled in the pertinent art to make and use the aspects. The drawings are for illustration purposes only and are not necessarily drawn to scale.

DETAILED DESCRIPTION

The exemplary aspects of the disclosure will be described with reference to the accompanying drawings. However, the aspects of the disclosure can be embodied in a variety of ways and should not be interpreted as being limited to the exemplary embodiments set forth herein. These embodiments are provided such that the disclosure is exhaustive and comprehensive, and the scope of the disclosure can be completely conveyed to those skilled in the art. The scope of the disclosure shall not be limited by the expressions used in elaborating the embodiments.

Figure 1:
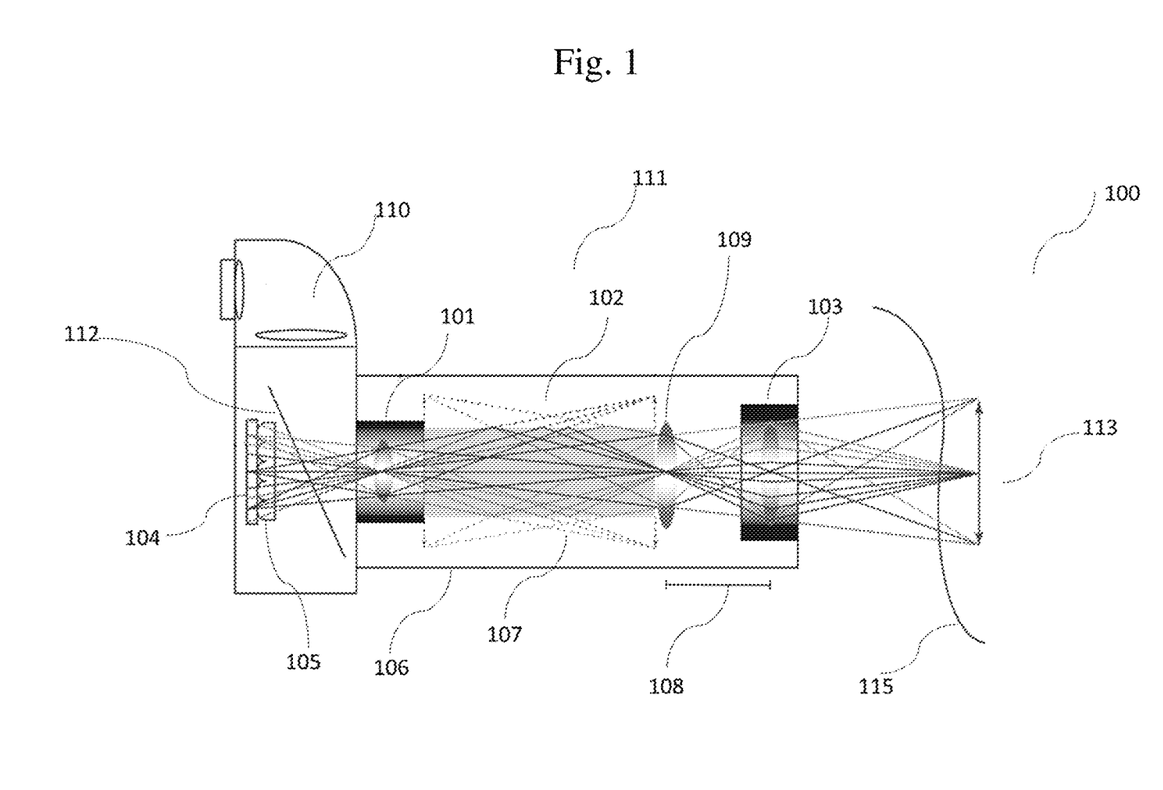
FIG. 1 illustrates an optical path diagram of the imaging system according to an exemplary embodiment of the disclosure.

FIG. 1 is the optical path diagram of the 3D imaging system of the disclosure. The 3D imaging system 100 is a portable camera that can be used by users, wherein the imaging part 110 and lens part 111 are integrated. The imaging part 110 comprises a camera sensor 104, a compound eye lens 105 and a reflector 112. The camera sensor 104 employs Advanced Photo System Type-C (APS-C) or Full Frame image sensor in digital single-lens reflex cameras, or other sensors with high imaging quality; the compound eye lens 105 comprises a combination of a plurality of small lenses, which can capture the information of a certain image (such as a light field image) from different angles, and thus separate 3D information to identify a specific object. The compound eye lens 105 comprises a microlens array and is designed to generate the depth map in addition to capturing a plurality of light field images. Also, the compound eye lens 105 is used by the camera sensor 104, and thus it is related to the parameters for the camera sensor 104. For example, each of the microlenses of compound eye lens 105 has a radius of 0.5 mm, a thickness of 0.9 μm, and a distance from each other of 60 μm. Compared to the camera sensor 104, the dimension of the compound eye lens is scalable. In one embodiment, the dimensions for APS-C image sensor are 25 mm×17 mm. In another embodiment, the dimensions for Full Frame image sensor are 37 mm×25 mm.

The reflector 112, also known as holophote, is provided in the imaging part 110. The reflector can be a reflective lens in a typical single-lens reflex camera, to ensure that the light enters eyes after passing through the lens part 111, so as to find a view. The reflector 112 is arranged in the imaging part 110 such that it is at an angle of 45° with respect to the lens part 111.

The lens part 111 is integrated into a housing 106 and is detachably connected to the imaging part 110. The lens part 111 includes a first camera lens 101 and a second camera lens 103, wherein the first camera lens 101 is a rear camera lens which has adjustable aperture and focal length. The second camera lens 103 is a front camera lens. The focal length of the camera can be adjusted by the front and rear camera lenses. The second camera lens 103 can be replaced. An entrance pupil plane and matching device 109, which can be a pupil lens, is positioned between the first camera lens 101 and the second camera lens 103. The position relationship between the pupil lens 109 and the second camera lens 103 can be adjusted by an adjustment device 114 (shown in FIG. 2). The pupil lens 109 can be a single lens to focus the light and can compress the information received by the second camera lens 103. A first imaging process is performed at the second camera lens 103. If the second camera lens 103 is replaced, the imaging angle may be different. The first camera lens 101 can be a short focal lens or a macro lens, which is fixed onto the housing 106. The size of the imaging system of the disclosure is determined by the design of the first camera lens 101. A second imaging process is performed at the first camera lens 101. The entrance pupil plane and matching device 109 is designed to adjust light beam. An internal reflection unit 102 is provided between the entrance pupil plane and matching device 109 and the first lens 101. The internal reflection unit 102 decomposes and refracts the image into a multi-angle image having independent secondary images with different angular offsets. The internal reflection unit 102 is designed to provide multiple virtual images in different angles of view. The size and proportion of the internal reflection unit 102 are key factors for multiple refractions and refraction image ratio to generate images at different angles. The secondary images for each refraction are slightly different in the scene, and the target image has a little offset. The dimensions of the internal reflection unit 102 and the focal length for each secondary image can be calculated by the following equations (1) and (2).

$$\tan\left(\frac{FOV}{2}\right) \times Z/n \quad (1)$$

$$\frac{f_{lens}}{f_{sub}} = mFOV \qquad (2)$$

wherein FOV is the field of view of the second camera lens;

n is the refractive index of the internal reflection unit;

r is the number of internal refractions;

X, Y, Z are the dimensions of the internal reflection unit, i.e., width, height, and length, respectively;

$f_{lens}$ is the focal length of the second camera lens;

$f_{sub}$ is the focal length for the secondary image.

The internal reflection unit 102 can be of the same size as the camera. In one embodiment, the dimensions may be 24 mm (W)×36 mm (H)×95 mm (L), which means the dimension ratio is 2:3:8. A pupil lens is used to match the internal reflection unit and achieve refractions in the internal reflection unit. For this purpose, the diameter of the pupil lens should be greater than the internal reflection unit. In one embodiment, the pupil lens has a diameter of 50 mm and a focal length of 12.5 mm. As long as the aperture of the front camera lens is larger than the internal reflection unit, the front camera lens can be designed to be replaceable by any camera lens.

In one embodiment, in the case of the target scene 115, the focal plane 113 is illustrated in FIG. 1, and the distance between the entrance pupil plane and matching system 109 and the second camera lens 103 (i.e., front camera lens) is the focal length 108 of the front camera lens; the light is refracted by the internal reflection unit 102 multiple times and captured by the first camera lens 101 (i.e., rear camera lens) and the compound eye lens 105. The image information is obtained by the camera sensor 104.

Figure 2:
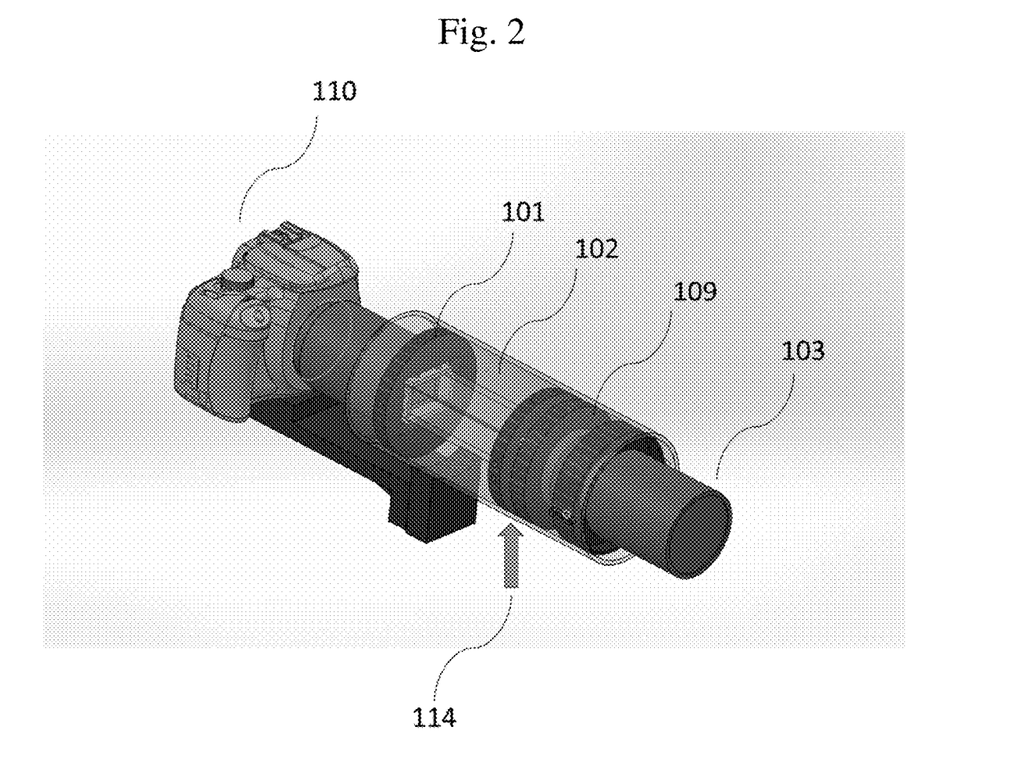
FIG. 2 illustrates a perspective view of the imaging system according to an exemplary embodiment of the disclosure.

FIG. 2 is a perspective view of the imaging system of the disclosure. The whole imaging system 100 is portable. The rear camera lens 101 is at the rear of the imaging system, close to the user, so as to facilitate the view-finding and operation of the user. The pupil lens 109 is positioned between the rear camera lens 101 and front camera lens 103, and the internal reflection unit 102 is positioned between the rear camera lens 101 and the pupil lens 109. In addition, the adjustment device 114, by which the focal length can be adjusted such that clear images can be obtained even in microcosmic photography, is arranged at a fixed front camera lens 103.

Figure 3:
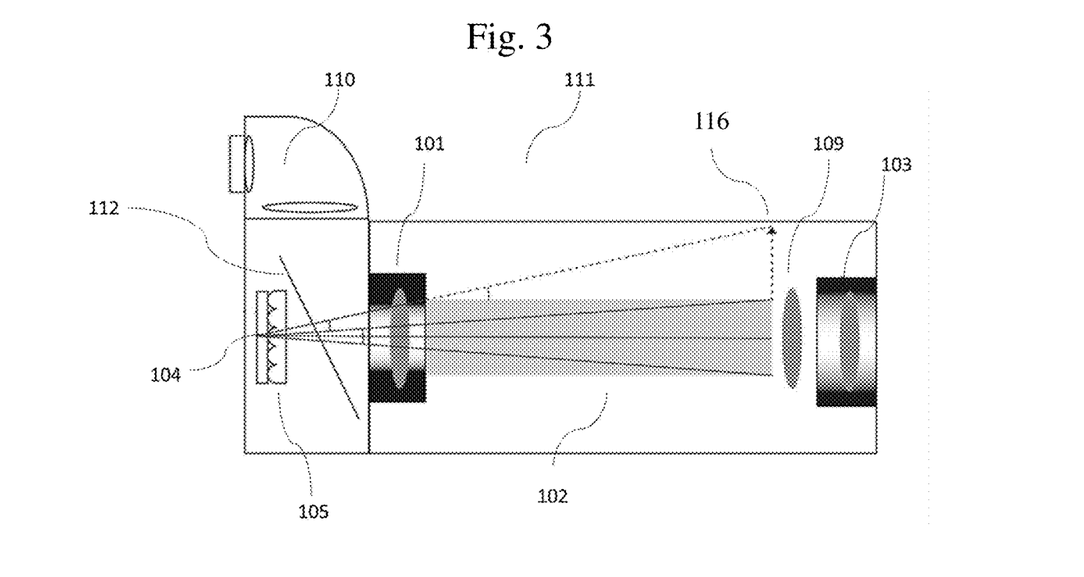
FIG. 3 illustrates an angle of view of the internal reflection unit of the imaging system according to an exemplary embodiment.

FIG. 3 illustrates an angle of view of the internal reflection unit of the imaging system. In the internal reflection unit 102, the angle of view of the camera lens is allocated equally, and each refractive mirror shares the same angle as the central image. Therefore, the number of inner refractions, refractive index and the field of view of the camera lens are important factors to the size of the internal reflection unit. As shown in FIG. 3, a virtual image 116 is positioned between the rear camera lens 101 and the entrance pupil plane and matching system 109, and positioned closer to the entrance pupil plane and matching system 109. The virtual image 116 passes through the internal reflection unit 102, rear camera lens 101, reflector 112 and compound eye lens 105, and is captured by camera sensor 104. In one embodiment, a Full Frame camera, which includes a 50 mm front camera lens 103 and a 50 mm rear camera lens 101 (both lenses with an angle of view of 50°), may be used. In another embodiment, an APS-C camera, which includes a 50 mm front camera lens 103 and a 30 mm rear camera lens (both lenses with an angle of view of 50°), may be used. For both embodiments, the refractive index is 1, and the number of refractions is 1. Therefore, there are 9 secondary images in a single image, and each secondary image has an angle of view of about 15.6°. Moreover, in the above two embodiments, wireless image transfer and video recording function can be employed. Therefore, the two embodiments can be used in the photography of virtual reality.

Figure 4:
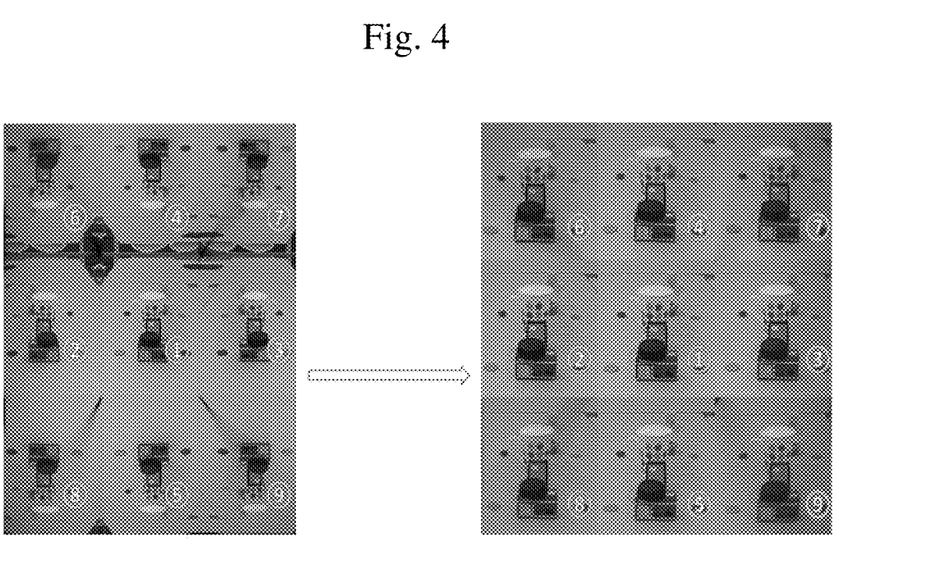
FIG. 4 illustrates a schematic diagram illustrating a normalization process after capturing a single image by the imaging system according to an exemplary embodiment of the disclosure. The left panel of FIG. 4 a view before the normalization process, which includes nine (9) secondary images (①-⑨). The right panel of FIG. 4 shows a view after the normalization process on the corresponding secondary images (①-⑨).

FIG. 4 is a schematic diagram illustrating the normalization process after capturing a single image by the imaging system according to the disclosure. For example, the left panel of FIG. 4 is the view before the normalization process, which includes nine (9) secondary images (①-⑨); the right panel of FIG. 4 is the view after the normalization process on the corresponding secondary images ①-⑨. The normalization is performed using the following equations:

$$\begin{cases} I'_2 = \mathrm{mirror}(I_2, \text{left}) \\ I'_3 = \mathrm{mirror}(I_3, \text{right}) \\ I'_4 = \mathrm{mirror}(I_4, \text{up}) \\ I'_5 = \mathrm{mirror}(I_5, \text{down}) \\ I'_k = \mathrm{rotate}(I_k, \pi) k = 6, \ldots, 9 \end{cases} \qquad (3)$$

wherein $I_n$(n=2, 3, . . . , 9) represents the images before normalization; $I'_n$(n=2, 3, . . . , 9) represents the images after normalization; mirror($I_m$,left,right,up,down)(m=2, 3, 4, 5) represents left, right, up, and down of the images after mirroring; rotate($I_k$,π)(k=6, . . . , 9) represents the rotation of the image.

After each secondary image is normalized, the offset of the images can be readily identified. FIG. 4 illustrate the comparison between horizontal and vertical secondary images, and the offset depends on the position of the secondary image. By comparing the secondary images ④,①,⑤ in the same column in the right view, the displacement of the target can be easily observed from different angles of view. The pattern observed in secondary image ④ is slightly blocked in the secondary image ① and in the secondary image ④ is completely blocked. This phenomenon can also be observed in the horizontally placed secondary images ②,①,③. There is horizontal offset for the images in the right panel of FIG. 4.

Figure 5:
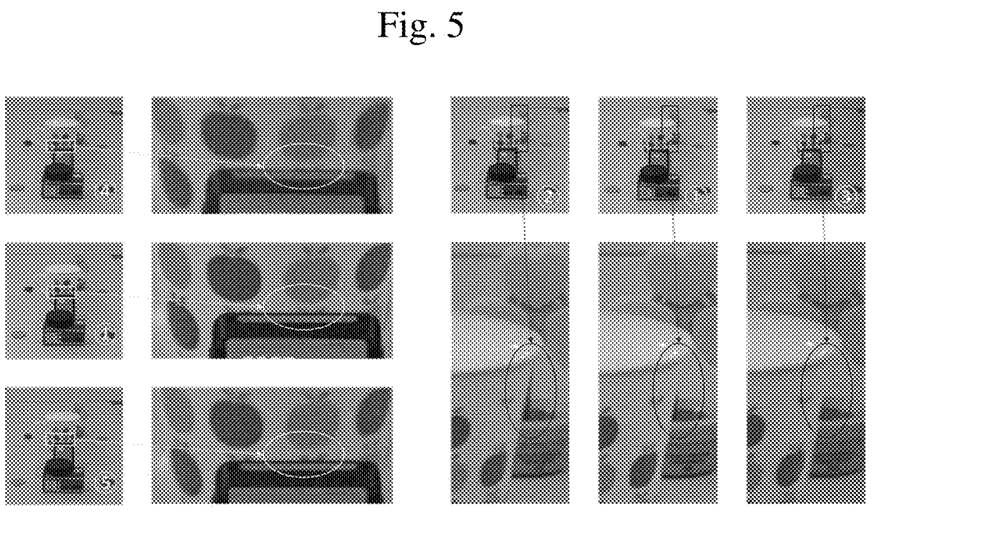
FIG. 5 illustrates a schematic diagram illustrating different angle of views (which are slightly different) after comparing the secondary image by the imaging system according to an exemplary embodiment of the disclosure.

FIG. 5 illustrates a schematic diagram illustrating a slightly different angle of view after comparing the secondary image by the imaging system of the disclosure. After the compound eye images have been processed by a computer, the image can be refocused to calculate the depth map and perform 3D display. In a virtual reality 3D embodiment, the secondary image ④,⑤ can be transmitted to a head-wearing display device. The horizontal array combination of secondary image ④,①,⑤ can be refocused. The depth map of the target can be calculated at different angles of the secondary image. In the left view of FIG. 5, the secondary images ④,①,⑤ correspond one by one to the offset images. In another virtual reality 3D embodiment, the secondary images ②,③ can be projected onto the head-wearing display device. The vertical array combination of the secondary images ②,①,③ can be refocused. The depth map of the target can be calculated at different angles of the secondary images. In the right view of FIG. 5, the secondary images ②,①,③ correspond one by one to the offset images. Detailed image processing is illustrated in FIG. 7.

Figure 6:
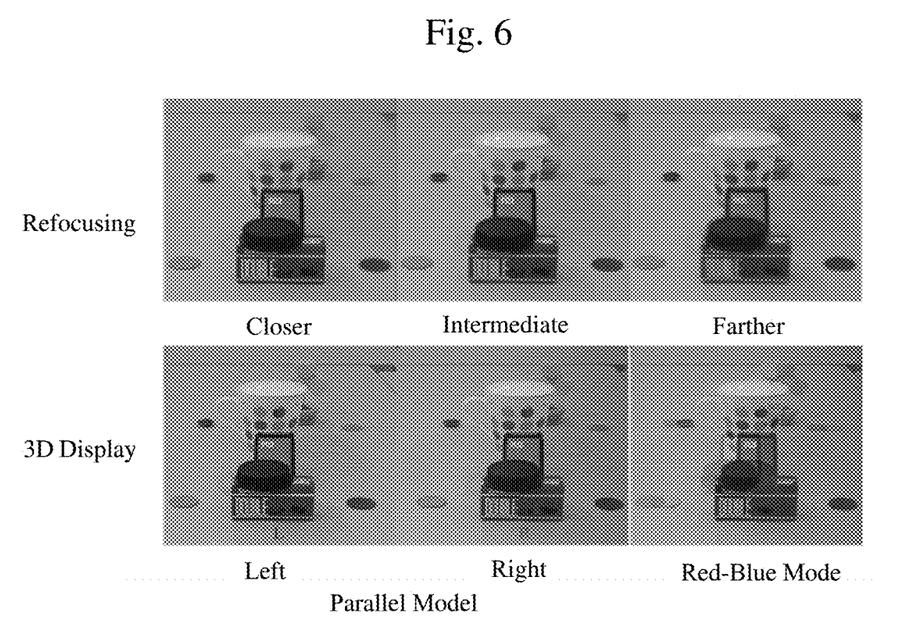
FIG. 6 illustrates a schematic diagram illustrating the refocusing and 3D display step by the imaging system according to an exemplary embodiment of the disclosure.

FIG. 6 is a schematic diagram illustrating the refocusing and 3D display step by the imaging system of the disclosure. The upper view of FIG. 6 illustrates the images after refocusing in closer mode, intermediate mode and farther mode; the lower view shows the left, right and red-blue mode images after the 3D display rendering step.

Figure 7:
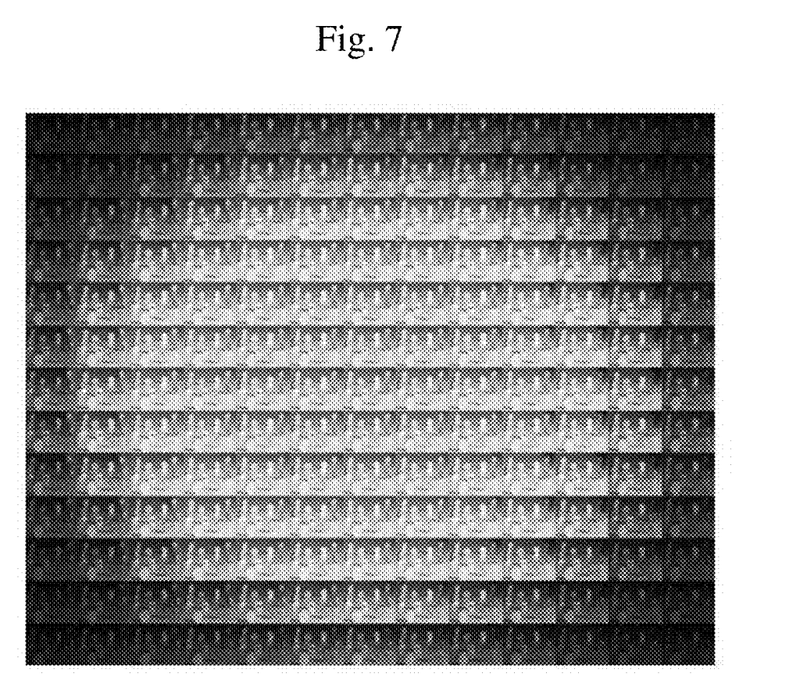
FIG. 7 illustrates a schematic diagram illustrating a multi-view sub-aperture image array obtained by the imaging system according to an exemplary embodiment of the disclosure.
Figure 9:
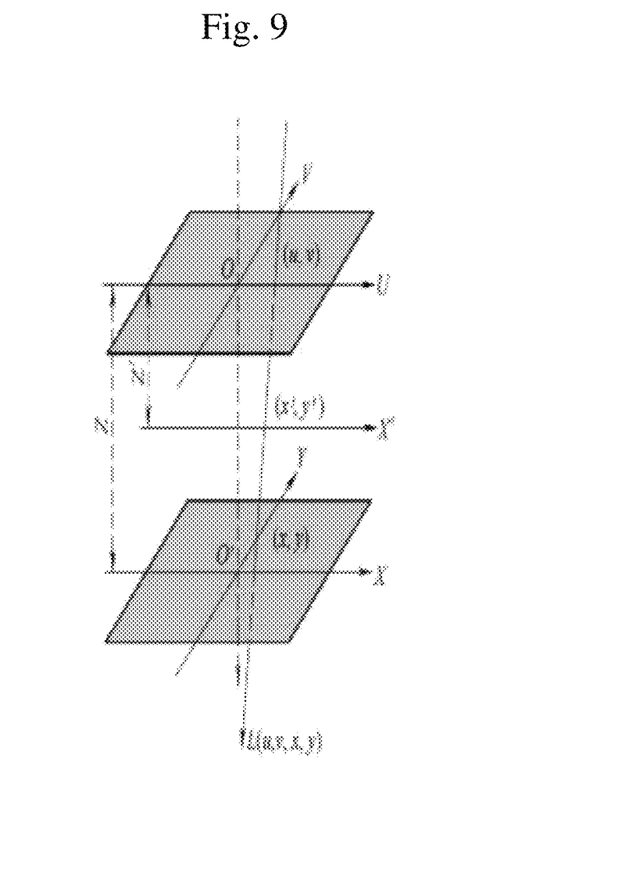
FIG. 9 illustrates the principle for digital refocusing according to an exemplary embodiment of the disclosure.

FIG. 7 illustrates a schematic diagram illustrating a multi-view sub-aperture image array obtained by the imaging system of the disclosure, wherein the multi-view sub-aperture image array is obtained after processing the original compound eye image. Based on the above synthetic aperture technique, the pixels in the original compound eye image are re-projected into each sub-aperture image, forming images at different angles of view. The light field information in the original compound eye image can be further synthesized and extracted to obtain the multi-angle view of the imaged space and thereby the digital refocusing sequence; the depth map is also obtained. The synthetic aperture image is digitally refocused by using the following principles, as shown in FIG. 9:

$$I(x, y) = \int_u^{u+\Delta u} \int_v^{v+\Delta v} L(u, v, x, y) du dv \quad (4)$$

$$\frac{u-x}{u-x'} = \frac{z}{z'} = k \quad (5)$$

$$L'(u, v, x', y') = L(u, v, kx' + (1-k)u, ky' + (1-k)v) \quad (6)$$

$$I'(x', y') = \int \int L(u, v, kx' + (1-k)u, ky' + (1-k)v) du dv, \quad (7)$$

wherein I and I' are the coordinate systems of the first and second imaging planes, respectively; L and L' are the energy of the first and second imaging planes, respectively.

Figure 8:
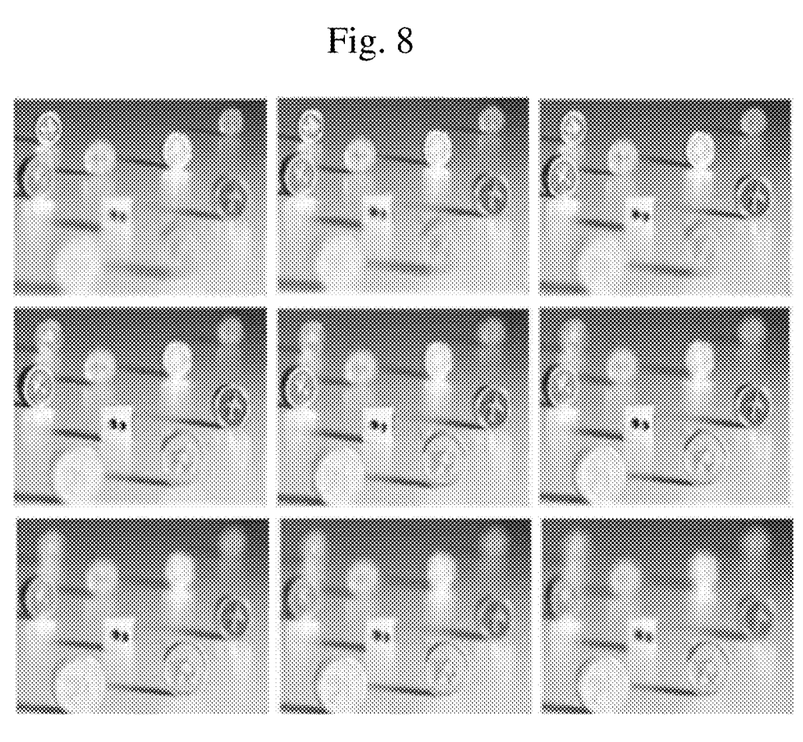
FIG. 8 illustrates the digital refocusing effect of the compound eye according to an exemplary embodiment of the disclosure.

FIG. 8 illustrates the digital refocusing effect.

Based on the focusing degree (contrast) of the object in different refocusing planes, the focal plane of each object in the scene can be calculated, such that the front-rear relationship of each object can be estimated. Meanwhile, the depth map of the scene space can be calculated by extracting and using the epipolar geometry relations of the multi-angle views.

The foregoing description is to explain the technical solution of the disclosure. One skilled in the art may modify or change the above embodiments without departing from the spirit and scope of the disclosure. The disclosure has been clarified with reference to some embodiments. However, other embodiments covered by the disclosure are also possible. The different features and steps in the disclosure can be combined in a way that is not described herein. Therefore, the scope of the invention is only limited by appended claims. Moreover, one skilled in the art may readily understand that the parameters, dimensions, materials, and configuration are for the purpose of illustration, and the actual parameters, dimensions, materials and configuration depend on particular applications or applications that are taught by the disclosure.

What is claimed is:

1. An adaptive 3D imaging system comprising:
an imaging part and a lens part detachably connected thereto, wherein the lens part has a first end and a second end;
the imaging part comprising a sensor and a reflector configured to transmit a plurality of captured light field images to the sensor;
wherein the lens part comprises a first camera lens positioned at the first end of the lens part, a second camera lens positioned at the second end of the lens part, an entrance pupil plane and matching device positioned between the first camera lens and the second camera lens and being adaptive to different focal lengths of the second camera lens, an internal reflection unit positioned between the first camera lens and the entrance pupil plane and matching device and configured to decompose the captured light field images and refract them into a plurality of secondary images with different angular offsets.

2. The adaptive 3D imaging system of claim 1, wherein the imaging part further comprises a compound eye lens configured to transmit the plurality of captured light field images to the sensor.

3. The adaptive 3D imaging system of claim 2, wherein the compound eye lens comprises an array of a plurality of microlenses, wherein each microlens comprises a radius, a thickness and an array spacing that are each related to the dimensions of the sensor.

4. The adaptive 3D imaging system of claim 2, wherein apertures and focal lengths of the first camera lens and the second camera lens are adjustable, and the second camera lens is replaceable.

5. The adaptive 3D imaging system of claim 3, wherein the aperture of the second camera lens is larger than the internal reflection unit.

6. The adaptive 3D imaging system of claim 1, wherein the entrance pupil plane and matching device is a pupil lens, wherein a diameter of pupil lens is greater than a diameter of the internal reflection unit, and wherein the pupil lens is configured to allow the entrance light of the light field images to be refracted in the internal reflection unit.

7. The adaptive 3D imaging system of claim 1, wherein each secondary image has a different scene, and dimensions of the internal reflection unit and a focal length of each secondary image are calculated based on the following equations (1) and (2):

$$\tan\left(\frac{FOV}{2}\right) \times Z/n \quad (1)$$

$$\frac{f_{lens}}{f_{sub}} = rFOV \quad (2)$$

wherein FOV is the field of view of the second camera lens;
n is the refractive index of the internal reflection unit;
r is the number of internal refractions;
Z is the dimension of the internal reflection unit;
$f_{lens}$ is the focal length of the second camera lens; and
$f_{sub}$ is the focal length for the secondary image.

8. The adaptive 3D imaging system of claim 6, wherein each secondary image has a different scene, and dimensions of the internal reflection unit and a focal length of each secondary image are calculated based on the following equations (1) and (2):

$$\tan\left(\frac{FOV}{2}\right) \times Z/n$$

$$\frac{f_{lens}}{f_{sub}} = rFOV$$

wherein FOV is the field of view of the second camera lens;
n is the refractive index of the internal reflection unit;
r is the number of internal refractions;

Z is the dimension of the internal reflection unit;
$f_{lens}$ is the focal length of the second camera lens; and
$f_{lub}$ is the focal length for the secondary image.

* * * * *